(12) United States Patent
Hooper, Jr.

(10) Patent No.: US 7,843,640 B2
(45) Date of Patent: Nov. 30, 2010

(54) LIGHT SHELVES FOR DAYLIGHTING

(75) Inventor: William J. Hooper, Jr., Lawrenceville, GA (US)

(73) Assignee: Alcoa Inc., Pittsburgh, PA (US)

(*) Notice: Subject to any disclaimer, the term of this patent is extended or adjusted under 35 U.S.C. 154(b) by 232 days.

(21) Appl. No.: 12/335,875

(22) Filed: Dec. 16, 2008

(65) Prior Publication Data

US 2010/0149643 A1   Jun. 17, 2010

(51) Int. Cl.
*G02B 27/00* (2006.01)

(52) U.S. Cl. .................................. 359/596; 160/236

(58) Field of Classification Search ......... 359/596–597, 359/591; 160/130, 236; 362/1, 346, 342
See application file for complete search history.

(56) References Cited

U.S. PATENT DOCUMENTS

| | | | | |
|---|---|---|---|---|
| 2,146,816 A | * | 2/1939 | Grassby, Jr. ............ | 160/178.1 R |
| 2,546,335 A | * | 3/1951 | Friend ..................... | 359/596 |
| 4,304,218 A | * | 12/1981 | Karlsson ................. | 126/607 |
| 4,509,825 A | | 4/1985 | Otto et al. ................ | 359/592 |
| 4,630,892 A | | 12/1986 | Howard ................... | 359/597 |
| 4,634,222 A | | 1/1987 | Critten ..................... | 359/596 |
| 4,699,467 A | | 10/1987 | Bartenbach et al. ...... | 359/592 |
| 4,989,952 A | | 2/1991 | Edmonds ................. | 359/592 |
| 5,204,777 A | * | 4/1993 | Curshod .................. | 359/596 |
| 5,293,305 A | | 3/1994 | Koster ..................... | 362/147 |
| 5,295,051 A | | 3/1994 | Cowling .................. | 362/576 |
| 5,461,496 A | | 10/1995 | Kanada et al. ........... | 359/592 |
| 5,802,784 A | | 9/1998 | Federmann .............. | 52/204.5 |
| 6,318,441 B1 | * | 11/2001 | Love et al. ............... | 160/236 |
| 6,456,427 B1 | | 9/2002 | Chen et al. .............. | 359/337.1 |
| 6,480,336 B2 | | 11/2002 | Digert et al. ............. | 359/596 |
| 6,616,285 B2 | | 9/2003 | Milner .................... | 359/613 |
| 6,688,373 B2 | * | 2/2004 | Corey et al. .............. | 160/236 |
| 6,691,701 B1 | | 2/2004 | Roth ....................... | 126/685 |
| 6,901,988 B2 | * | 6/2005 | Colson et al. ............ | 160/168.1 R |
| 6,988,525 B2 | | 1/2006 | Moulton .................. | 160/52 |
| 2002/0040770 A1 | * | 4/2002 | Colson et al. ............ | 160/236 |

* cited by examiner

*Primary Examiner*—Christopher Mahoney
(74) *Attorney, Agent, or Firm*—Greenberg Traurig, LLP (57) ABSTRACT

The embodiments disclosed herein relate to light shelves for daylighting, and more particularly to light shelves that include both a diffuser and a reflector. According to aspects illustrated herein, there is provided a light shelf that includes at least one anchor bracket suitable for attachment to a building structure; at least one support beam attached to the anchor bracket; and a plurality of light transmitting airfoil-shaped louvers each supported and positioned by the support beam at a preselected fixed profile angle, wherein each of the louvers includes a diffuser and a reflective surface.

18 Claims, 7 Drawing Sheets

LIGHT SHELVES FOR DAYLIGHTING

BACKGROUND

Natural solar light, i.e., sunlight, is a very desirable light source for interior use. Daylighting is the method of lighting a building's interior with full-spectrum, sunlight which supplements or replaces electric lighting during the daytime. There are many benefits to using daylight for illuminating areas within enclosed structures such as buildings. The use of daylight over artificial illumination for interior illumination provides a more balanced color rendering of objects which is more aesthetically pleasant and also reduces the need for energy to illuminate the interior of the building artificially. An additional benefit is the reduced amount of radiant energy produced by artificial illumination sources which can, in turn, reduce the amount of cooling needed to maintain a comfortable temperature within a building.

A problem that is frequently encountered when an area is illuminated using artificial light sources or natural daylight is how to spread the light adequately and evenly. Simple diffusers in the form of a sheet of translucent material can be used to spread light but, although they are inexpensive, they do not transmit light efficiently and are also unable to direct light in a controlled manner to where it is needed. Interior light shelves are often used on the inside of buildings to block sunlight into a building space and "bounce" the sunlight upward and deeper into the interior space. The light shelves are attached to the interiors of the buildings and extend outward away from the buildings facade. Artificial light shelves have been proven to reduce requirements for perimeter artificial lighting, thereby conserving electrical energy costs. In many cases, architects are designing curtain wall systems where light shelves are directly integrated into the structural members of the curtain wall.

SUMMARY OF THE DISCLOSURE

There is provided in one aspect a light transmitting louver that includes a louver wherein: a first curved element of the louver has a first end and a second end, wherein the first curved element is composed of a plastic or metal; a second element of the louver has a first end and a second end, wherein the first end of the second element connects with the second end of the first curved element, and wherein the second element includes a diffuser; and a third curved element of the louver has a first end and a second end, wherein the second end of the second element connects with the first end of the third curved element, and wherein the third curved element includes a reflective surface, wherein the first curved element, the second element, and the third curved element connect such that the louver forms an airfoil-shaped body.

In an embodiment, the first end of the first curved element and the second end of the third curved element do not meet, resulting in an opening in the airfoil-shaped body which allows for the channeling of light to the diffuser of the second element.

In another aspect, the present invention provides a light transmitting louver that includes a louver wherein: a first curved element of the louver has a first end and a second end, wherein the first curved element is composed of a plastic or metal, and wherein at least a portion of a surface of the first curved element includes a reflective surface; and a second curved element of the louver has a first end and a second end, wherein the first end of the second curved element connects with the second end of the first curved element, and wherein the second curved element includes a diffuser; wherein the first curved element and the second curved element connect such that the louver forms an airfoil-shaped body.

In an embodiment, the first end of the first curved element and the second end of the second curved element do not meet, resulting in an opening in the airfoil-shaped body which allows for the channeling of light to the reflective surface of the first curved element.

In still another aspect of the present invention, there is provided a light shelf that includes at least one anchor bracket suitable for attachment to a building structure; at least one support beam attached to the anchor bracket; and a plurality of light transmitting airfoil-shaped louvers each supported and positioned by the support beam at a preselected fixed profile angle, wherein each of the louvers includes a diffuser and a reflective surface.

In an embodiment, the light transmitting airfoil-shaped louvers of the light shelf include a first curved element having a first end and a second end, wherein the first curved element is composed of a plastic or metal; a second element having a first end and a second end, wherein the first end of the second element connects with the second end of the first curved element, and wherein the second element includes the diffuser lens; and a third curved element having a first end and a second end, wherein the second end of the second element connects with the first end of the third curved element, and wherein the third curved element includes the reflective surface.

In another embodiment, the light transmitting airfoil-shaped louvers of the light shelf include a first curved element having a first end and a second end, wherein the first curved element is composed of a plastic or metal, and wherein at least a portion of a surface of the first curved element includes the reflective surface; and a second curved element having a first end and a second end, wherein the first end of the second curved element connects with the second end of the first curved element, and wherein the second element includes the diffuser.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

FIGS. 5A and 5B show the light shelf of FIG. 3 integrated into structural members of a curtain wall.

FIGS. 6A and 6B show the light shelf of FIG. 4 integrated into structural members of a curtain wall.

While the above-identified drawings set forth presently disclosed embodiments, other embodiments are also contemplated, as noted in the discussion. This disclosure presents illustrative embodiments by way of representation and not limitation.

DETAILED DESCRIPTION

The present invention is now discussed in more detail referring to the drawings that accompany the present application. In the accompanying drawings, like and/or corresponding elements are referred to by like reference numbers.

Light shelves provide the advantage of shifting light from a window so that the light comes from a more overhead direction, improving the quality of illumination. Light shelves require direct sunlight, and provide useful daylighting of a zone that lies along the exterior wall. The width of this zone depends on the height of the top of the window, the orientation of the window, the latitude of the site, the time of day, and the clarity of the sky. The width of the zone varies with sunlight conditions. With typical clear windows, for example, the zone may extend inward a distance of about 10 feet to about 20 feet. The light penetration may be deeper if the window is very tall.

Windows that face the sun receive energy that could be useful for daylighting. In principle, if a window faces anywhere between southeast and southwest and if the window receives direct sunlight, each unit of window area could illuminate 20 to 100 units of interior area. However, this is possible only if the sunlight can be distributed efficiently. The challenges of distributing this free lighting energy are lighting geometry and glare. In order for illumination to be useful, illumination must come from overhead. Raw sunlight coming through a window falls on the floor, so some method is needed to redirect the sunlight so that the sunlight comes from overhead.

Many concepts have arisen for taming the sunlight that enters through windows. A typical prior art light shelf is essentially a mirror that is installed inside a window, facing upward. The mirror reflects incoming sunlight toward the ceiling. The reflection is controlled by the law of optics that says the angle of reflection equals the angle of incidence. The ceiling then distributes the light into the working areas of the space. If the sun is low in the sky, sunlight penetrates deeply into the space. If however, the sun is high, the ceiling is illuminated close to the wall.

Pure specular reflection creates a sharply defined rectangular bright spot on the ceiling. You can reduce this effect by making the reflecting surface of the light shelf more diffuse. This spreads out the light on the ceiling. However, it also concentrates the ceiling illumination close to the light shelf. If the reflection is very diffuse, penetration into the space is sacrificed.

As used herein, the term "daylighting" refers to applications in which natural daylight is allowed into buildings or other structures (such as vessels or aircraft) through openings provided with means by which the amount of usable light entering through the opening is enhanced by various means. This may be achieved, for example, by diverting light from incident angles at which they would not otherwise provide useful light within the building or other structure, or by capturing light passing the opening which would not otherwise enter the building through it.

As used herein, the term "diffuser" refers to a medium that scatters light. In an embodiment, the light is scattered evenly.

As used herein, the term "reflective surface" refers to a surface that reflects or shifts light.

As used herein, the term "light transmitting louver" refers to a louver of the present invention having a diffuser for scattering sunlight, and a reflector for shifting sunlight.

As used herein, the term "airfoil-shaped body" refers to the shape of a louver of the present invention as seen in cross-section. The airfoil-shape resembles the cross-section of a wing.

As used herein, the term "channeling of light" refers to the redirection of light (e.g., sunlight) to the inside of a space. The channeling of light provides a better distribution of light into a room (e.g., for task lighting or ambient lighting).

As used herein, the term "curtain wall" refers to a building facade, typically spanning multiple floors, which does not carry any dead load from the building other than its own dead load.

Figure 1:
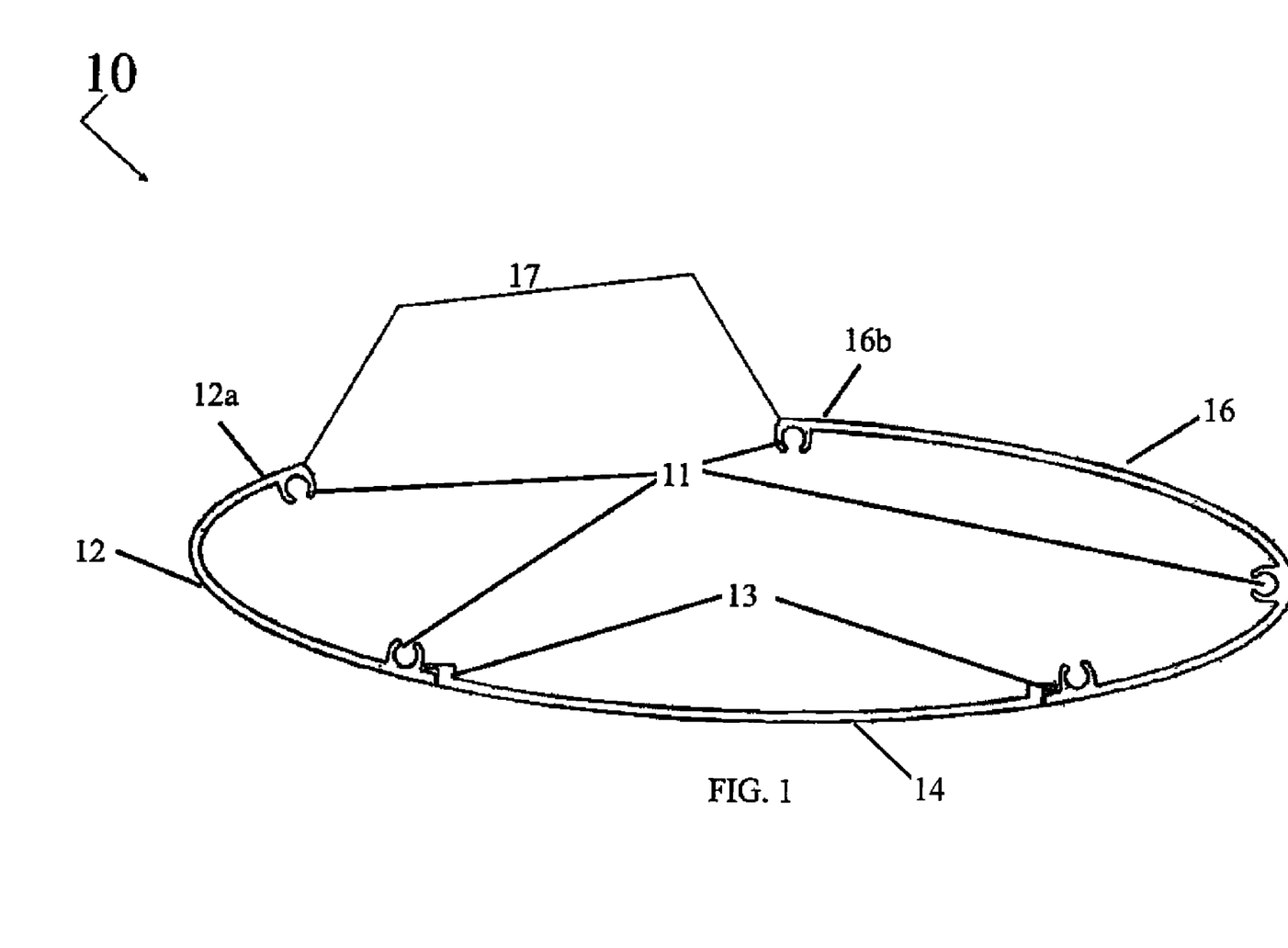
FIG. 1 depicts a side view of an illustrative embodiment of a light transmitting louver of the present invention.

FIG. 1 is a side view of an illustrative embodiment of a light transmitting louver 10 of the present invention. The light transmitting louver 10 includes a first structural element 12, a second element 14, and a third element 16. The first element 12 and the third element 16 connect with the second element 14, such that the louver 10 forms an airfoil-shaped body, as viewed in cross-section. The first element 12 and the third element 16 are structural elements, and are fabricated from a plastic or metal material. The second element 14 has lips 13, that are responsible for the connection of the second element 14 with both the first element 12 and the third element 16. The lips 13 provide a means for the second element 14 to rest on the structural elements of the first element 12 and the third element 16. The second element 14 essentially is held by gravity between the first element 12 and the third element 16. In an embodiment, the second element 14 can be easily removed from the remaining elements of the louver 10 such that the second element 14 can be cleaned or replaced, for example, in the event that dust collects on top of the second element 14. In an embodiment, fasteners can be used to attach the second element 14 to the first element 12 and the third element 16. In an embodiment, the second element 14 includes a diffuser. In an embodiment, the second element 14 is composed of a diffuser. In an embodiment, the second element 14 is manufactured from a diffuser material, such as a diffuser lens that scatters light. An opening 17 is created in the airfoil-shaped body of the louver 10. The opening 17 is created due to a first end 12a of the first element 12 not meeting up with a second end 16b of the third element 16. The third element 16 includes a reflective material. In an embodiment, the third element 16 includes a reflective surface. In an embodiment, the third element 16 is composed of a reflective material. In an embodiment, the third element 16 is manufactured from a reflective material. In an embodiment, the third element 16 is manufactured from a plastic or metal material that further includes a surface having a reflective material. Connecting means 11 are used to connect the louver 10 to a structural element to create a light shelf.

Figure 2:
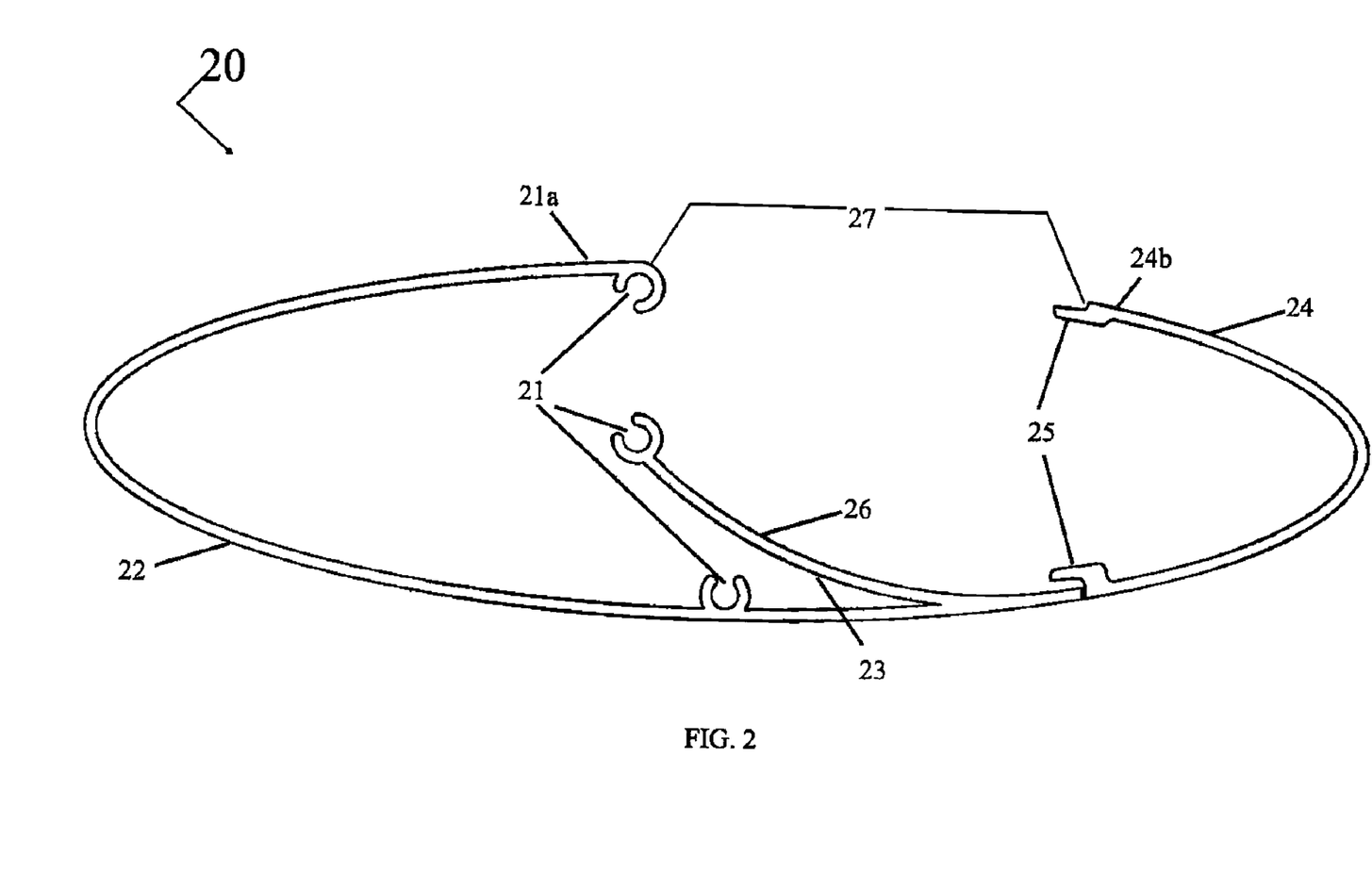
FIG. 2 depicts a side view of an illustrative embodiment of a light transmitting louver of the present invention.

FIG. 2 is a side view of an illustrative embodiment of a light transmitting louver 20 of the present invention. The light transmitting louver 20 includes a first structural element 22 and a second element 24. The first element 22 connects with the second element 24 such that the louver 20 forms an airfoil-shaped body, as viewed in cross-section. The second element 24 has two lips 25. One of the lips 25, connects the second element 24 with the first element 22, while the other lip 25 is capable of connecting with an end cap, as will be described in detail below. In an embodiment, the first element 22 and the second element 24 can be easily disassembled such that the various elements can be cleaned or replaced if needed. The first element 22 is a structural element, and is fabricated from a plastic or metal material. In an embodiment, at least a portion 23 of the first element 22 includes a reflective material. In an embodiment, the portion 23 is manufactured from a reflective material. In an embodiment, the portion 23 is composed of a reflective material. In an embodiment, the portion 23 is manufactured from a plastic or metal material that further includes a surface having a reflective material. The second element 24 is manufactured from a diffuser material, such as a diffuser lens that scatters light. An opening 27 is created in the airfoil-shaped body of the louver 20. The opening 27 is created due to a first end 22a of the first element 22 not meeting up with a second end 24b of the second element 24. Connecting means 21 are used to connect the louver 10 to a structural element to create a light shelf.

In an embodiment, the plastic material of the structural elements of the present invention are reinforced with fiberglass. In an embodiment, the metal material of the structural elements of the present invention are an aluminum or aluminum composite material (ACM). In an embodiment, the diffuser is fabricated from a polycarbonate plastic material. In an embodiment, the diffuser is fabricated from an acrylic material. In an embodiment, the diffuser is a clear material. In an embodiment, the reflective surface is made from an aluminum material. In an embodiment, the reflective surface is a highly polished aluminum surface. In an embodiment, the reflective material is a plastic material displaying a highly polished reflective surface.

Figure 3:
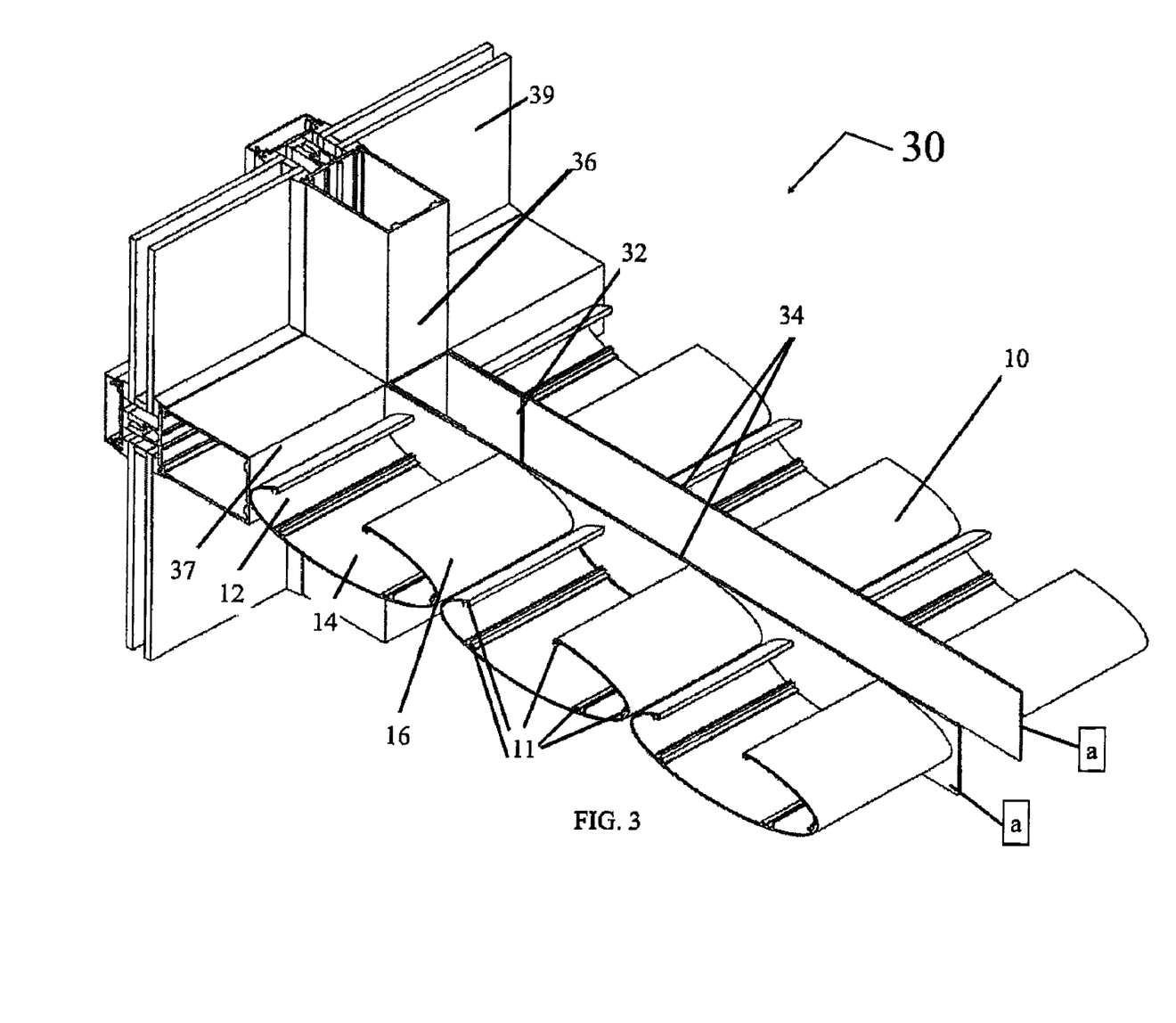
FIG. 3 depicts a perspective view of an illustrative embodiment of a light shelf of the present invention having a plurality of the light transmitting louvers of FIG. 1.

FIG. 3 is a perspective view of an illustrative embodiment of a light shelf 30 of the present invention having a plurality of the light transmitting louvers 10. As shown in FIG. 3, the light shelf 30 includes two support beams 34 separated by, and engaged to, a center anchor bracket 32. In the embodiment shown in FIG. 3, the light shelf 30 is integrated into structural members of a curtain wall 39. For example, the center anchor bracket 32 can attach to a vertical mullion 36 of the curtain wall 39. Attached to surface "a" of each of the support beams 34 are the plurality of louvers 10. For example, in the embodiment depicted in FIG. 3, three of the louvers 10 engage each of the support beams 34. The louvers 10 engage the support beam 34 through at least one of the connecting means 11. In an embodiment, each of the louvers 10 are attached to the support beam 34 by running a screw through the support beam 34 and into connecting means 11. The connecting means 11 can run an entire length of the louvers 10. In an embodiment, each of the louvers 10 are attached to the support beam 34 by a shear clip. In an embodiment, each of the louvers 10 are attached to the support beam 34 by an adhesive bonding.

Figure 4:
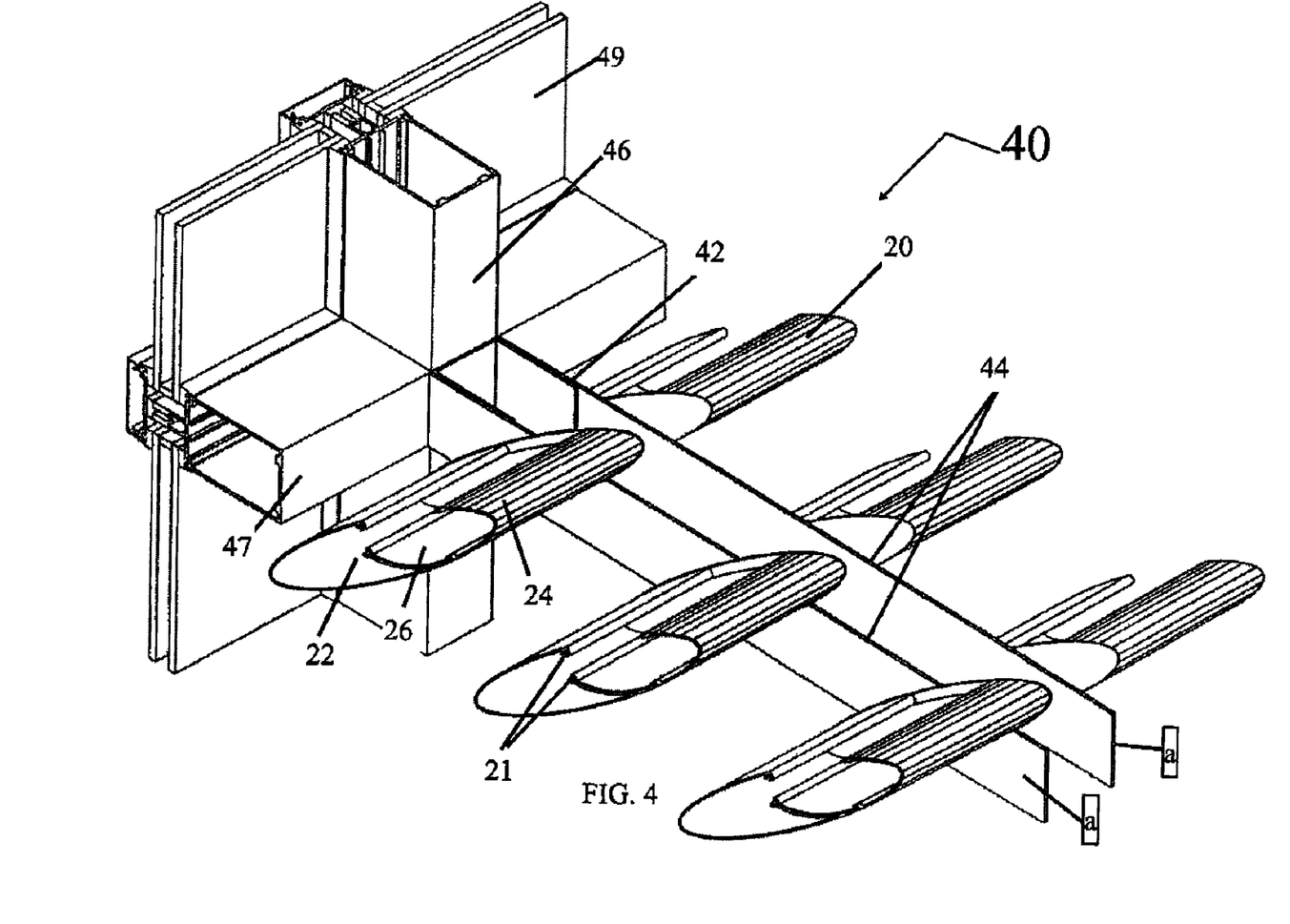
FIG. 4 depicts a perspective view of an illustrative embodiment of a light shelf of the present invention having a plurality of the light transmitting louvers of FIG. 2.

FIG. 4 is a perspective view of an illustrative embodiment of a light shelf 40 of the present invention having a plurality of the light transmitting louvers 20. As shown in FIG. 4, the light shelf 40 includes two support beams 44 separated by, and engaged to, a center anchor bracket 42. In the embodiment shown in FIG. 4, the light shelf 40 is integrated into structural members of a curtain wall 49. For example, the center anchor bracket 42 can attach to a vertical mullion 46 of the curtain wall 49. Attached to surface "a" of each of the support beams 44 are the plurality of louvers 20. For example, in the embodiment depicted in FIG. 4, three of the louvers 20 engage each of the support beams 44. The louvers 20 engage the support beams 44 through at least one of the connecting means 21. In an embodiment, each of the louvers 20 are attached to the support beam 44 by running a screw through the support beam 44 and into connecting means 21. The connecting means 21 can run an entire length of the louvers 20. In an embodiment, each of the louvers 20 are attached to the support beam 44 by a shear clip. In an embodiment, each of the louvers 20 are attached to the support beam 44 by an adhesive bonding.

The support beams and anchor brackets of any of the light shelves of the present invention can be fabricated from an extruded aluminum. In an embodiment, the light shelves of the present invention serve as an interior extension to a curtain wall horizontal, reflecting sunlight deeper into the interior of a building by "bouncing" natural light up to the ceiling In an embodiment, the light shelves of the present invention serve as an interior extension to a curtain wall horizontal, diffusing sunlight to the space below the light shelf by "scattering" natural light down.

Figure 5A:
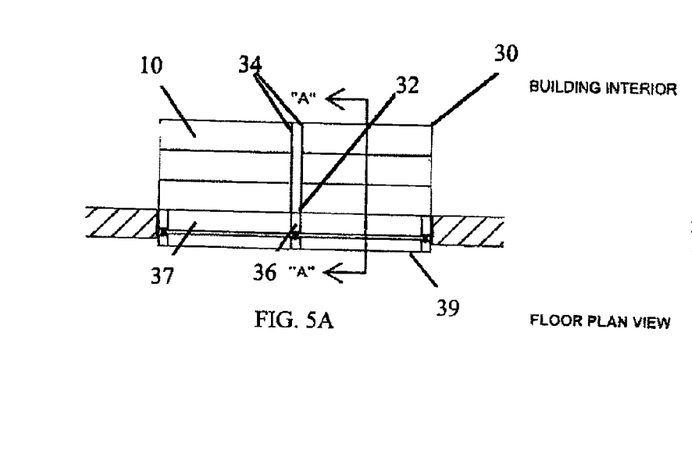
FIG. 5A is a floor plan view of the light shelf.
Figure 5B:
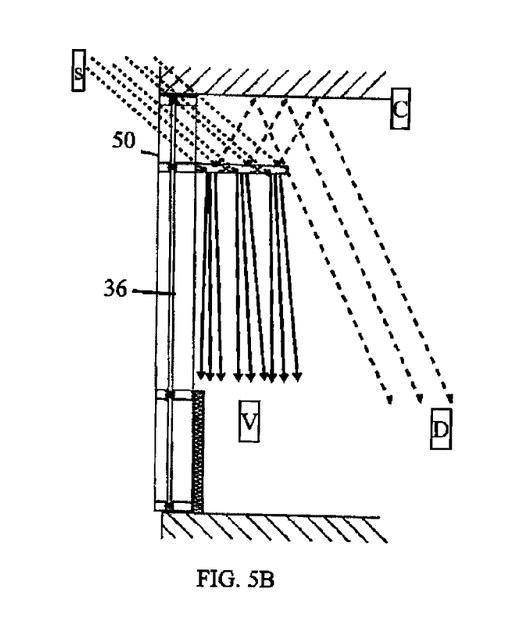
FIG. 5B is a cross-sectional view of the light shelf taken along line A-A of FIG. 5A.

FIG. 5A shows a floor plan view of the light shelf 30 of the present invention integrated into the structural members of the curtain wall 39. FIG. 5B is a cross-sectional view taken along line A-A of FIG. 5A. As illustrated in FIG. 5B, sunlight rays s cross through a glass window 50 and reach the louvers 10. The louvers 10 are positioned and attached to the support beams 34 such that rays of sunlight s hit the second element 14 and diffuses through the second element 14 to the space below V, thus providing a source of natural ambient light in the vicinity under the light shelf 30. Sun rays s also are capable of hitting the third element 16, where they are reflected off of the third element 16 in an upward direction towards the ceiling C. The light shelf 30 provides both natural ambient light to the area V below the light shelf 30, as well as natural ambient light to an area D deep within the interior space of the room.

Figure 6A:
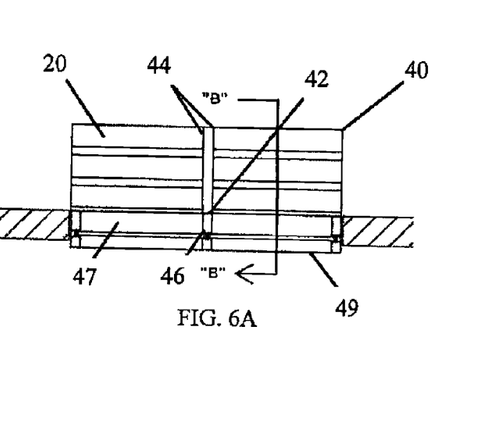
FIG. 6A is a floor plan view of the light shelf.
Figure 6B:
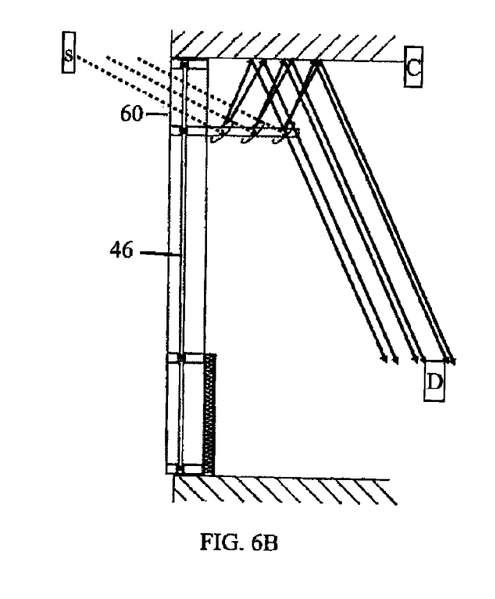
FIG. 6B is a cross-sectional view of the light shelf taken along line B-B of FIG. 6A.

FIG. 6A shows a floor plan view of the light shelf 40 of the present invention integrated into the structural members of the curtain wall 49. FIG. 6B is a cross-sectional view taken along line B-B of FIG. 6A. As illustrated in FIG. 6B, sunlight rays s cross through a glass window 60 and reach the louvers 20. The louvers 20 are positioned and attached to the support beams 44 at an angle such that sunlight s hits the reflective surface 26 of the first element 22 and reflects off of the reflective surface 26 onto the second element 24. The reflective rays are diffused out towards the ceiling C, followed by incident rays bouncing off of the ceiling C and penetrating to an area D deep within the interior space of the room. The angle at which the louvers 20 are positioned and attached to the support beams 44 can be determined based on the buildings elevation and position to the sun. The angle will control the intensity of the reflected light which ultimately determines that amount of light wash to the interior of the space. The angle of the louvers 20 can be determined by the placement of the connecting means 21 for the fasteners that hold the louver 20 to the support beams 44.

Figure 7:
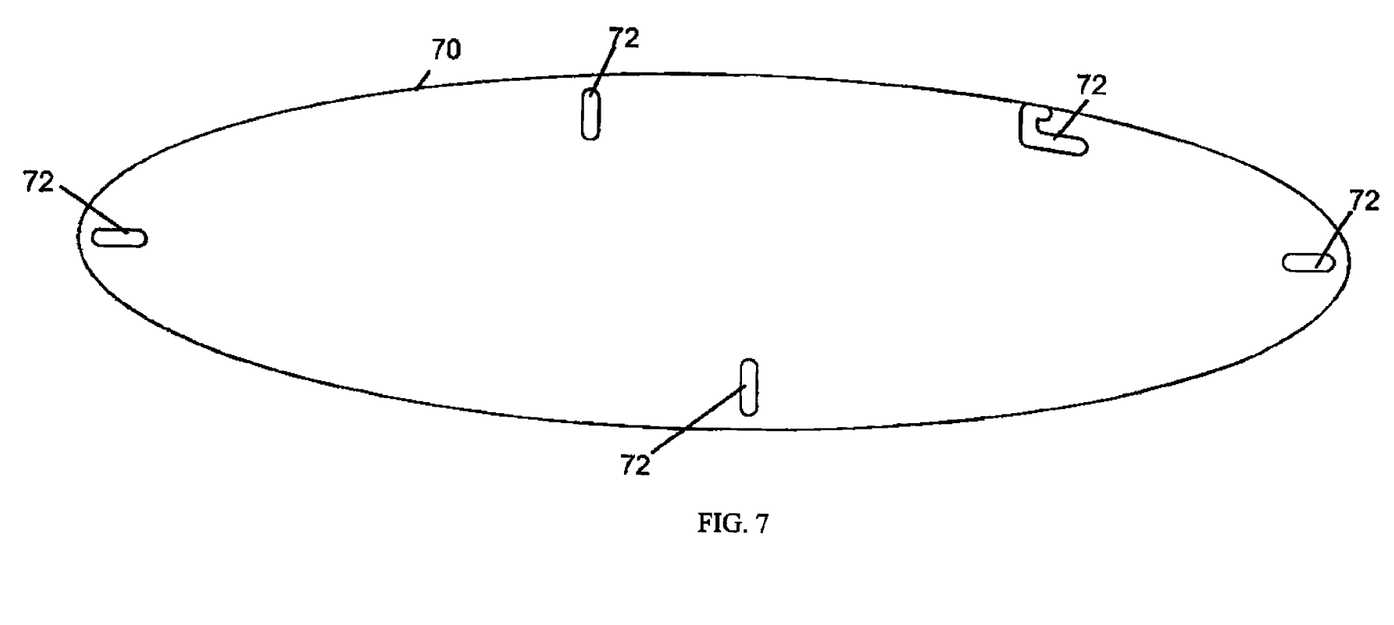
FIG. 7 depicts a side view of an illustrative embodiment of an end cap of the present invention for use with a light transmitting louver of the present invention.
Figure 8:
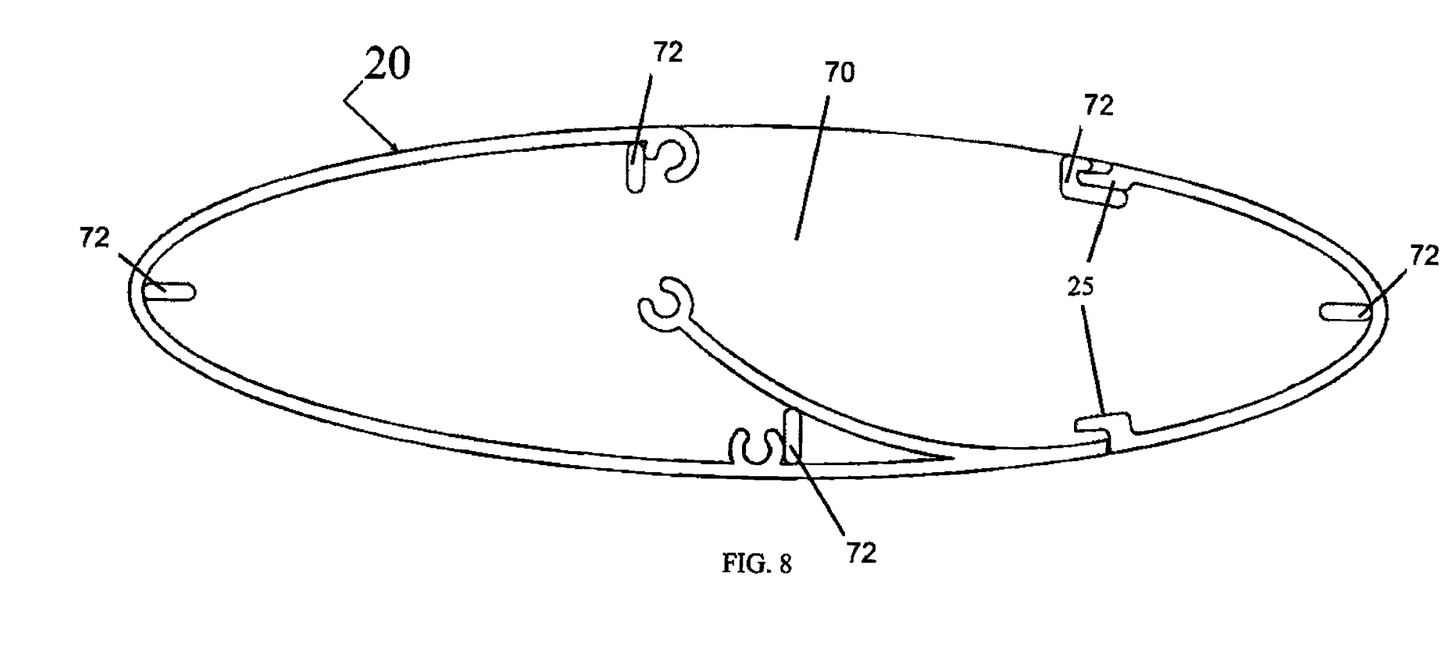
FIG. 8 depicts a side view of the light transmitting louver of FIG. 2 having the end cap of FIG. 7.

FIG. 7 is a side view of an illustrative embodiment of an end cap 70 of the present invention. The end cap 70 is a light shelf end treatment that can be used, for example, in punched opening applications. The end cap includes at least one catch 72 which helps engage the end cap 70 with a light transmitting louver of the present invention. FIG. 8 shows a side view of end cap 70 positioned and engaged with the louver 20. The end cap 70 is designed to provide engagement points for the lip 25 of the louver 20 via at least one catch 72. The lip 25 engages the first element 22 and the end cap 70.

The light shelves of the present invention can be attached directly to a curtain wall system or to a building structure if the window area is essentially a punched area. Any of the light shelves of the present invention can include end caps for punched opening applications. In an embodiment, a depth of the light shelves of the present invention range from about 20 inches up to about 40 inches. In an embodiment, the light shelves of the present invention have a depth of about 30 inches. In an embodiment, a length of the light shelves of the present invention range from 30 inches to about 72 inches. In an embodiment, the light shelves of the present invention have a length of about 60 inches.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A light transmitting louver comprising:
   a louver wherein:
   a) a first curved element of the louver has a first end and a second end,
      wherein the first curved element is composed of a plastic or metal;
   b) a second element of the louver has a first end and a second end,
      wherein the first end of the second element connects with the second end of the first curved element, and
      wherein the second element includes a diffuser; and
   c) a third curved element of the louver has a first end and a second end,
      wherein the second end of the second element connects with the first end of the third curved element, and
      wherein the third curved element includes a reflective surface,
   wherein the first curved element, the second element, and the third curved element connect such that the louver forms an airfoil-shaped body.

2. The louver of claim 1 wherein the first end of the first curved element and the second end of the third curved element do not meet, resulting in an opening in the airfoil-shaped body.

3. The louver of claim 2 wherein the opening allows for the channeling of light to the diffuser of the second element.

4. The louver of claim 3 wherein the light is sunlight.

5. The louver of claim 1 wherein the reflector surface is made from an aluminum material.

6. The louver of claim 1 wherein the reflector surface is made from an acrylic plastic material.

7. The louver of claim 1 wherein the diffuser is a polycarbonate plastic material.

8. The louver of claim 1 wherein the diffuser is an acrylic plastic material.

9. A light transmitting louver comprising:
   a louver wherein:
   a) a first curved element of the louver has a first end and a second end, wherein the first curved element is composed of a plastic or metal, and wherein at least a portion of a surface of the first curved element includes a reflective surface; and
   b) a second curved element of the louver has a first end and a second end, wherein the first end of the second curved element connects with the second end of the first curved element, and
      wherein the second curved element includes a diffuser;
   wherein the first curved element and the second element connect such that the louver forms an airfoil-shaped body;
   wherein the first end of the first curved element and the second end of the second curved element do not meet, resulting in an opening in the airfoil-shaped body.

10. The louver of claim 9 wherein the opening allows for the channeling of light to the reflective surface of the first curved element.

11. The louver of claim 10 wherein the light reflects off of the reflective surface and channels to the diffuser of the second curved element.

12. The louver of claim 10 wherein the light is sunlight.

13. The louver of claim 9 wherein the reflective surface is made from an aluminum material.

14. The louver of claim 9 wherein the reflective surface is made from an acrylic plastic material.

15. The louver of claim 9 wherein the diffuser is a polycarbonate plastic material.

16. The louver of claim 9 wherein the diffuser is an acrylic plastic material.

17. A light shelf comprising:
   at least one anchor bracket suitable for attachment to a building structure;
   at least one support beam attached to the anchor bracket; and
   a plurality of light transmitting airfoil-shaped louvers each supported and positioned by the support beam at a preselected fixed profile angle,
   wherein each of the louvers includes a diffuser and a reflective surface;
   wherein each of the light transmitting airfoil-shaped louvers comprise:
      a first curved element having a first end and a second end,
         wherein the first curved element is composed of a plastic or metal;
      a second element having a first end and a second end,
         wherein the first end of the second element connects with the second end of the first curved element, and
         wherein the second element includes the diffuser; and
      a third curved element having a first end and a second end,
         wherein the second end of the second element connects with the first end of the third curved element, and
         wherein the third curved element includes the reflective surface.

18. The light shelf of claim 17 wherein each of the light transmitting airfoil-shaped louvers comprise:
   a first curved element having a first end and a second end,
      wherein the first curved element is composed of a plastic or a metal, and
      wherein at least a portion of a surface of the first curved element includes the reflective surface; and
   a second curved element having a first end and a second end,
      wherein the first end of the second curved element connects with the second end of the first curved element, and
      wherein the second element includes the diffuser.

* * * * *